R. G. BRADSHAW & J. C. LYELL.
FILM FOR COLOR PHOTOGRAPHY AND METHOD OF MAKING THE SAME.
APPLICATION FILED MAR. 7, 1914.

1,139,633.

Patented May 18, 1915.

Witnesses:

Inventors:
Richard Giles Bradshaw
and John Clarence Lyell,
By Attorneys,
Fraser, Funk & Myers

UNITED STATES PATENT OFFICE.

RICHARD GILES BRADSHAW AND JOHN CLARENCE LYELL, OF LONDON, ENGLAND.

FILM FOR COLOR PHOTOGRAPHY AND METHOD OF MAKING THE SAME.

1,139,633.  Specification of Letters Patent.  Patented May 18, 1915.

Application filed March 7, 1914. Serial No. 823,204.

*To all whom it may concern:*

Be it known that we, RICHARD GILES BRADSHAW and JOHN CLARENCE LYELL, subjects of the King of Great Britain, residing in London, England, have jointly invented certain new and useful Improvements in Films for Color Photography and Methods of Making the Same, of which the following is a specification.

This invention relates to films or screens for color photography and cinematography, and has for its object to provide a new or improved screen or film for this purpose and improved methods of and means for manufacturing the same.

According to the present invention we manufacture films for color photography and cinematography by coloring both sides of the film with different colors and scraping away the color in such manner that the parts from which the color is removed on one side expose the color on the other side. For example, by coloring a film or screen on one side with red and on the other side with green, which gives a resultant violet, we can by erasing different parts of the green or red coloring in small points, fine lines, or other figures, obtain a colored screen or film giving either two colors, green and red, or a three color screen, red violet and green, in the required form. If required the substance of the film itself may be tinted or colored to give additional color or to modify the surface colors.

The accompanying drawings show in diagrams which are drawn to a greatly enlarged scale some films or screens made in accordance with this invention which will be described as applied to a cinematograph film.

Figure 1:
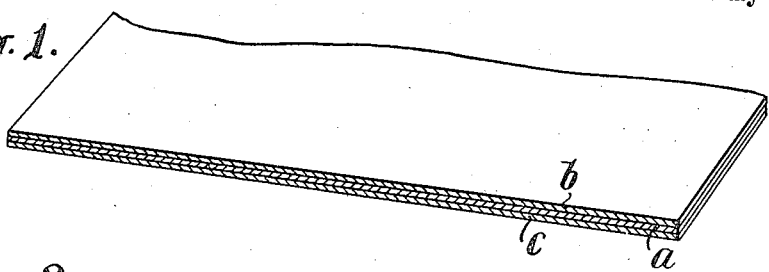
Figure 2:
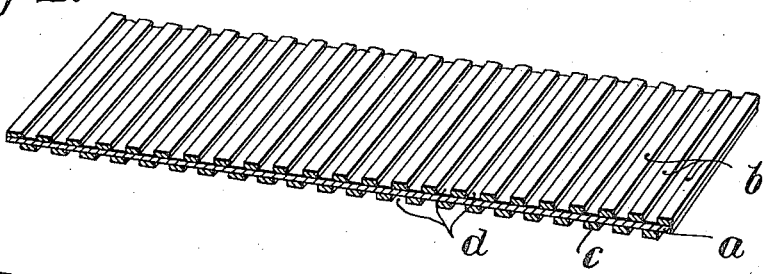
Figure 3:
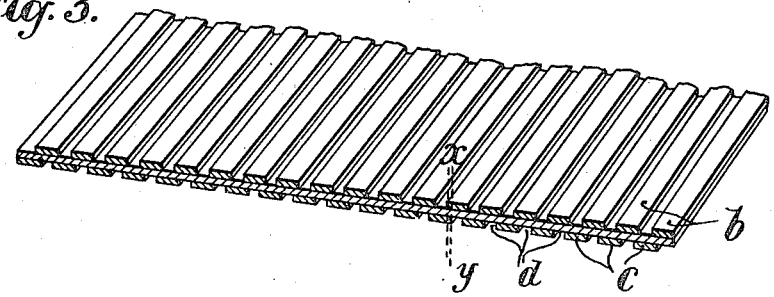

Figures 1 and 2 are perspective views in section showing a two colored screen before and after treatment; and Fig. 3 is a similar view to Fig. 2 showing a three color screen.

Referring now to one manner of carrying out this invention we take a film of celluloid or other suitable transparent substance and we dye or color one side of the film red or orange red and the other side green. From one surface of the film the color is now scraped or cut away in small points or fine lines or other figures and then the other side is treated in the same way, care being taken that the cuts or scrapes on one side are in juxtaposition with those on the other but are not superimposed. This gives a two color screen. If a three color screen is required, intermediate lines of spaces are left on both sides of the film in such manner that they are in register and will give a violet line.

In Fig. 1, *a* is the film covered with color ready for scraping, *b* the thickness of color, say green, on one side and *c* the thickness of color, say red, on the other side. In Fig. 2, the finished two colored screen is shown, *b* is the green color and *c* the red as before. The channels *d* show how the color has been scraped away, the cuts or scrapes on the green side alternating with those on the red side so that on looking through the screen the stripes of color would appear alternately as red and green.

In the three colored screen, Fig. 3, the stripes of red color *b* and the green color *c* are arranged to overlap so that at the overlapping parts indicated for example between the two dotted lines *x—y* will appear as a violet.

The film has on one side portions colored with a certain color and portions not so colored, and on the other side portions colored with a different color and portions not so colored, the color on each side being so disposed as to expose the color on the other side. The stripes of color and absence of color on each side are substantially parallel, and such stripes on the respective sides are also substantially parallel.

The before mentioned operations are effected by means of planes, scrapers, revolving circular cutters or other suitable contrivances so constructed or arranged that the lines are sufficiently fine and close together to produce the required effect.

What we claim is:—

1. The method of manufacturing films for color photography and cinematography, which consists in applying color to one side of a film and a different color to the other side, and then scraping away portions of the said color in such manner that the parts from which the color has been removed on each side expose the color on the other side.

2. The method of manufacturing films for color photography and cinematography, which consists in applying a uniform depth of color to one side of a film and a uniform depth of a different color to the other side, and then scraping away portions of the said color in such manner that the parts from which the color has been removed on each side expose the color on the other side.

3. The method of manufacturing films for color photography and cinematography, which consists in applying color to one side of a colored film and a different color to the other side, and then scraping away portions of the said color in such manner that the parts from which the color has been removed on each side expose the color on the other side.

4. The method of manufacturing films for color photography and cinematography, which consists in applying color to one side of a flat film and a different color to the other side, and then scraping away portions of the said color in such manner that the parts from which the color has been removed on each side expose the color on the other side.

5. The method of manufacturing films for color photography and cinematography, which consists in applying color to one side of a film and a different color to the other side, and then scraping away portions of the said color in substantially parallel stripes and in such manner that the stripes from which the color has been removed on each side expose the color on the other side.

6. A film for color photography and cinematography, having a color on one side and a different color on the other side, portions of the colors having been scraped away in such manner that the parts from which the color has been removed on each side expose the color on the other side.

7. A film for color photography and cinematography, having portions on one side of the film colored with a certain color and portions not so colored, and portions on the other side colored with a different color and portions not so colored, the color on each side being so disposed as to expose the color on the other side.

8. A film for color photography and cinematography, having a colored film and portions on one side of the film colored with a certain color and portions not so colored, and portions on the other side colored with a different color and portions not so colored, the color on each side being so disposed as to expose the color on the other side.

9. A film for color photography and cinematography, having stripes of color on one side of the film and stripes of a different color on the other side, the said stripes of color on each side being so disposed as to expose the stripes of color on the other side.

10. A film for color photography and cinematography, having stripes of color on one side of the film and stripes of a different color on the other side and substantially parallel with the first mentioned stripes, the said stripes of color on each side being so disposed as to expose the stripes of color on the other side.

11. A film for color photography and cinematography, having stripes of color on one side of the film and stripes of a different color on the other side, the said stripes of color on each side being so disposed as to expose the stripes of color on the other side, the stripes being so arranged that those on one side do not overlap the stripes on the other side.

12. A film for color photography and cinematography, having stripes of color on one side of the film and stripes of a different color on the other side and substantially parallel with the first mentioned stripes, the said stripes of color on each side being so disposed as to expose the stripes of color on the other side, the stripes being so arranged that those on one side do not overlap the stripes on the other side.

In witness whereof, we have hereunto signed our names in the presence of two subscribing witnesses.

RICHARD GILES BRADSHAW.
JOHN CLARENCE LYELL.

Witnesses:
   HENRY SIMONS BAKER,
   ALFRED BEESLEY CAMPBELL.